FIP8502 XR 3,395,967

Aug. 6, 1968 C. KARR 3,395,967
METHOD AND DEVICES FOR SUPPLYING A MAGNETOHYDRODYNAMIC GENERATOR
Filed Jan. 26, 1965 4 Sheets-Sheet 1

Aug. 6, 1968 C. KARR 3,395,967

METHOD AND DEVICES FOR SUPPLYING A MAGNETOHYDRODYNAMIC GENERATOR

Filed Jan. 26, 1965 4 Sheets-Sheet 4

United States Patent Office 3,395,967
Patented Aug. 6, 1968

3,395,967
METHOD AND DEVICES FOR SUPPLYING A MAGNETOHYDRODYNAMIC GENERATOR

Claude Karr, Paris, France, assignor to Commissariat à l'Energie Atomique, Paris, and Institut Francais du Petrole des Carburants et Lubrifiants, Rueil-Malmaison, Hauts-de-Seine, France Filed Jan. 26, 1965, Ser. No. 428,078
Claims priority, application France, Feb. 8, 1964, 963,123
9 Claims. (Cl. 431—1)

This invention has for its object a method and device for supplying a magnetohydrodynamic generator.

Magnetohydrodynamic generators, which are intended to convert the mechanical energy of a fluid in motion into electrical energy, essentially consist of a magnetohydrodynamic conversion nozzle in which an electrically conducting fluid is admitted and subjected to the action of a magnetic field at right angles to the direction of flow of the fluid, the electromotive force which results from the displacement of the electric charges of the fluid within the magnetic field being collected between two electrodes which are placed inside the nozzle in contact with the fluid.

The invention is more especially applicable to magnetohydrodynamic generators in which the conducting fluid consists of a mixture of a hot carrier gas produced by combustion with a small proportion of elements which can readily be ionized and which are usually alkaline.

It is known that, by passing through the nozzle a gas stream which is temperature-modulated in the direction of flow or, in other words, which is provided in this direction with a succession of alternate zones or so-called "hot" zones (for example at a temperature of 3000° K.) and "cold" zones (for example at a temperature of 2000° K.), the specific power of a magnetohydrodynamic conversion nozzle is increased to a considerable extent, all other things being equal and in particular in respect of a same mean flow temperature.

A number of solutions have been proposed with this object in view.

A first solution consists in subjecting the plasma after combustion to electric heating by alternating current. The disadvantages of this system are the substantial expenditure of electric power and the production of pressure and velocity waves in the heating zone which have the effect of disturbing the gas flow and accelerating the mixing of hot zones and cold zones.

A second solution consists in the use of an acoustic resonance burner which is supplied with fuel and air. By means of this system, a periodic modulation of the flows of fuel and of oxidant which pass into a combustion chamber is produced in the form of a succession of fuel-combustion zones which essentially consist of air. It is considered necessary to ensure that the modulation referred-to results in a periodic modulation of temperature at the exit of the chamber in which the combustion takes place with a further addition of oxygen. The result thereby achieved is that a cold section in which no combustion takes place is followed by a hot section in which the flow-velocity profile has a high peak at the center of the section, so that there thus takes place a rapid mixing of hot sections and cold sections. Moreover, in order to take full advantage of the oxygen which is injected into the second stage with a view to obtaining a high hot-zone temperature, it is necessary to produce at the entrance of said stage zones having a high fuel concentration wherein the fuel composition practically corresponds to the limit of inflammability, which results in highly unsteady operation.

A third solution consists in effecting a pulsed injection of fuel into an oxygen-enriched air stream. However, this solution does not seem to be very effective since, under these conditions, the variation in combustion temperature as a function of the fuel concentration is relatively small (200 to 300° K. at a maximum).

It has also been proposed to effect a pulsed injection of oxygen into a mixture of air and fuel. However, in view of the high flow of oxygen which has to be injected in order to obtain sufficiently high flame temperatures, this injection gives rise to disturbances both of velocity and pressure which are detrimental to flame stability and to the maintenance of well-defined hot zones and cold zones.

The object of this invention is to create hot zones and cold zones without producing any modulation either of velocity or of pressure within the combustion chamber which would later result in the rapid mixing of these zones.

The invention is especially directed to a device for supplying a magnetohydrodynamic generator comprising means for supplying a first duct with a first fuel mixture and a combustion chamber which is intended to receive said mixture and which supplies the magnetohydrodynamic generator, said device being characterized in that it comprises means for supplying a second duct with a second fuel mixture having a different composition and a rotary member for putting each duct into communication with the combustion chamber in alternate sequence so that the magnetohydrodynamic generator is supplied with a temperature-modulated gas.

As a preferable feature, the two gaseous mixtures not only have different compositions and especially different proportions of oxidant with respect to the fuel but also have different temperatures.

According to a preferred form of embodiment, the device comprises means located upstream of the rotary member and designed to bring the two fuel mixtures to different temperatures and the ducts open onto a first face of a rotary disc pierced by a plurality of ports which are located at intervals in staggered relation in two concentric rings and which are intended to move in front of the outlets of said two ducts respectively.

The present invention makes it possible to prevent disturbances in flow velocity and pressure in the interface regions between the hot zones and cold zones, such disturbances being due to the combustion of gases having variable composition and temperature. By resorting to the use of sonic throats or any equivalent device for the two gas streams upstream of the combustion chamber, it is possible to choose pressures within the supply ducts which ensure that the flow velocities of the gases delivered therefrom are equal.

The hot zone temperature whch is adopted at the outset is preferably as high as possible, which in turn makes it possible to adopt an optimum value in respect of the fuel concentration of the mixture which generates hot zones and suitable values in respect of the preheating temperature and oxidant content. As will be apparent, the same effect can also be obtained by means of different combinations of values of preheating temperature and oxidant content (especially oxygen content). An increase in said oxidant content can compensate a reduction in preheating temperature and conversely.

The temperature which is adopted in the case of the cold zones should be such as to ensure a temperature difference with respect to the hot zones of at least 300° K. and preferably of the order of 500 to 1,000° K. This temperature is obtained by adopting a certain fuel concentration and a suitable proportion of oxidant. Recource may be had to preheating if this should prove necessary.

Under given conditions of production of the cold-zone temperature, it has been observed that, by suitably choosing the combination of values of preheating temperature and oxidant content of the hot zones among the different combinations of values which produce the initially chosen temperature, it is thus possible to prevent any pressure disturbances at the "hot zone-cold zone" interface.

Referring now to the accompanying figures, there will be described below certain characteristic forms of embodiment of the device according to the invention, said forms of embodiment being given solely by way of example and not in any limiting sense.

A type of magnetohydrodynamic generator to which the device described can be applied is described in the article published in the French review called Atomes, No. 216, December 1964.

Figure 1:
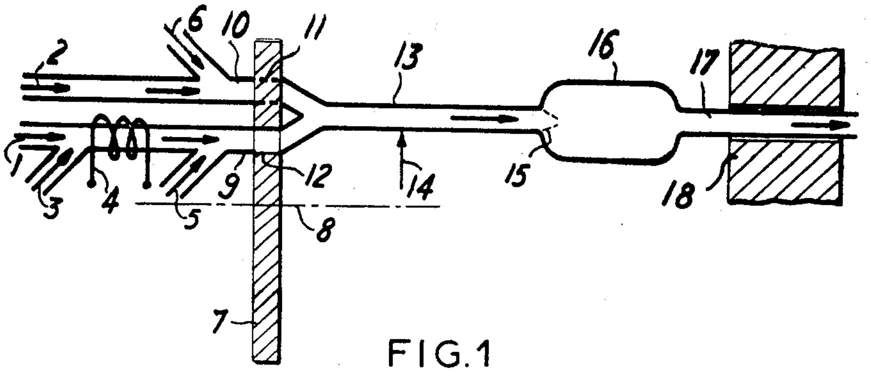
FIG. 1 is a general arrangement diagram of one form of embodiment of the device for the practical application of the method according to the invention.

In the form of embodiment which is shown digrammatically in FIG. 1, the "upstream" nozzles 1 and 2 are supplied with air under pressure and the air of nozzle 1 is enriched with oxygen at 3. The gaseous mixture within the nozzle is preheated at 4 whilst the air of nozzle 2 remains at room temperature. A gaseous fuel is fed in through the ducts 5 and 6 into the nozzles 1 and 2 respectively, the flow rates being variable at will.

Figure 1A:
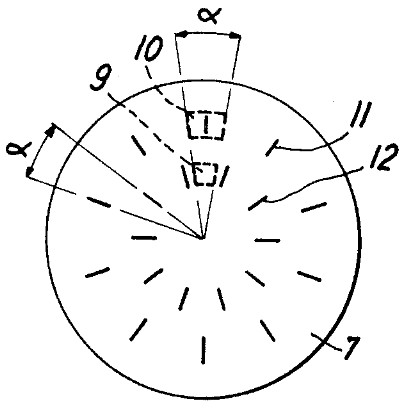
FIG. 1A is a front view of the distributor disc of FIG. 1.

The outlets 9 and 10 of the upstream nozzles are in contact with the disc 7 which is rotatable about the shaft 8. Said outlets are entirely located within a same angle $\alpha$ at the center of the disc (as shown in FIG. 1A) and both extend from one radius which delimits said angle to the other radius.

Ports 11 and 12 with sonic throats have been pierced in the thickness of the disc and are located at intervals in two separate rings which each comprise the same number of ports and which correspond respectively to the outlets of the two nozzles. The ratio of the cross-sectional area of the ports to that of the nozzle outlets is very small.

The spacing of the ports over the disc is chosen so as to ensure that there is always one, and only one, upstream nozzle outlet located opposite one port and that two ports of a same ring are never in communication at the same time with the outlet of a same upstream nozzle. These conditions entail the need to ensure that two consecutive ports of a same ring of the disc are located at an angular distance which is equal to double the angle $\alpha$ previously defined and that the ports 11 which are located on one of the rings are displaced through said angle $\alpha$ relatively to the ports 12 of the other ring.

On the other side of the disc relatively to the upstream nozzles 1 and 2 and opposite the outlets 9 and 10 are located in the inlets of a double nozzle, the two branches of which converge into the "downstream" nozzle 13 and direct therein in alternate sequence the gases supplied through each of the upstream nozzles in turn.

The alkaline "seed" is injected at 14 into the gaseous mixture prior to admission of this latter into the combustion chamber 16 in which said mixture is ignited by the annular pilot flame 15 before passing into the conversion chamber 17 which is located between the poles 18 of an electromagnet. As a result of the rotation of the disc 7, the combustion chamber 16 alternately admits gases having different temperatures and compositions, thus creating at 15 in alternate sequence "hot" zones (for example at 3,000° K.) and "cold" zones (for example at 2,000° K.). On the other hand, there are no disturbances either in pressure or velocity at the interface between a hot zone and a cold zone owing to the design of the disc which satisfies the conditions indicated earlier.

Figure 2:
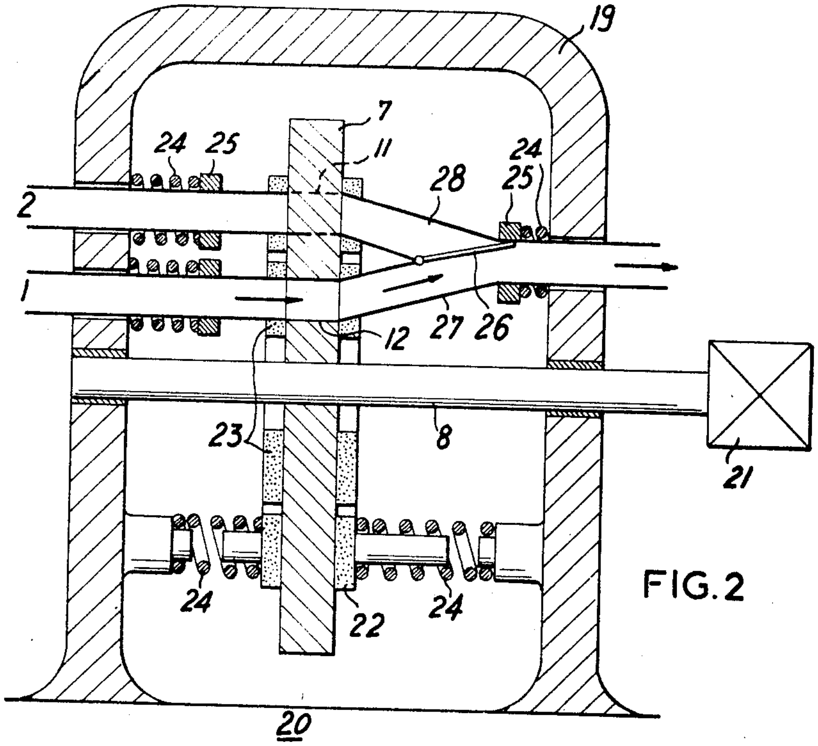
FIG. 2 illustrates means for ensuring fluid-tightness between the disc and the nozzles and for the purpose of preventing on the downstream side of the disc any mixing of the gas streams delivered from the upstream nozzles.

FIG. 2 illustrates a detail of a form of embodiment which is similar to the preceding, wherein the device is enclosed in a casing 19 which supports the different elements and which rests on a base plate 20. The motor which drives the shaft 8 of the disc 7 is shown at 21.

The above-mentioned motor can be an electric motor of conventional design with good speed stability.

Figure 2A:
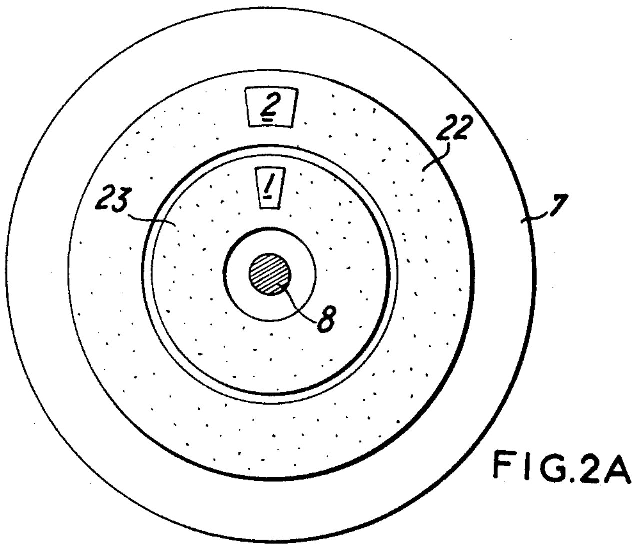
FIG. 2A shows the annular seals which are applied against one face of the disc.

Terminal sleeves 22 and 23 of graphite ensure both tightness of contact of the nozzles with the disc 7 and lubrication of this latter. Said terminal sleeves are tightly applied against the disc by means of springs 24 which bear on the casing 19 and on thrust-bearing collars 25 which are integral with the corresponding nozzles. FIG. 2A shows the shape of said terminal sleeves 22 and 23 which are placed around the disc shaft 8 in concentric circles.

The device comprises a flap valve 26, the function of which is to isolate each of the branches 27 and 28 of the double nozzle in alternate sequence. The gas which is supplied through nozzle 1 passes through a port 11, then flows towards the combustion chamber via the branch 27 and thrusts the flap valve 26 against the outlet of the branch 28, thus enclosing within said branch 28 the residual gas of the previous phase which was supplied through the nozzle 2. Said residual gas is thus prevented from mixing with the gas flow as this latter passes through nozzle 1.

Figure 3:
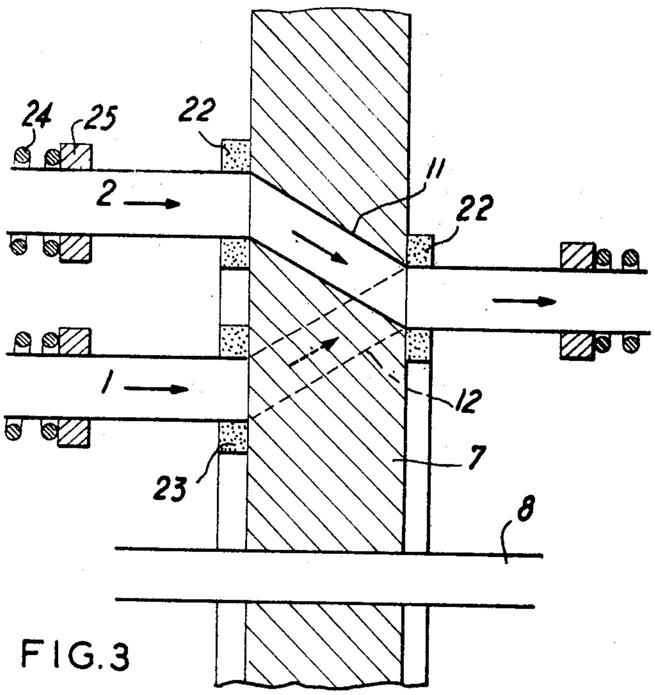
FIG. 3 shows another form of embodiment wherein a well-defined separation between the gas streams is ensured by means of the distributor disc itself.

In the form of embodiment which is illustrated in FIG. 3, the double nozzle is dispensed with as well as the flap valve by virtue of the special shape and arrangement of the sonic-throat ports 11 and 12 which are formed in the thickness itself of the disc 7. Accordingly, said ports put the upstream nozzles 1 and 2 into communication with the downstream nozzle 13. Fluid-tightness and lubrication are ensured in the same manner as in the previous example.

Figure 3A:
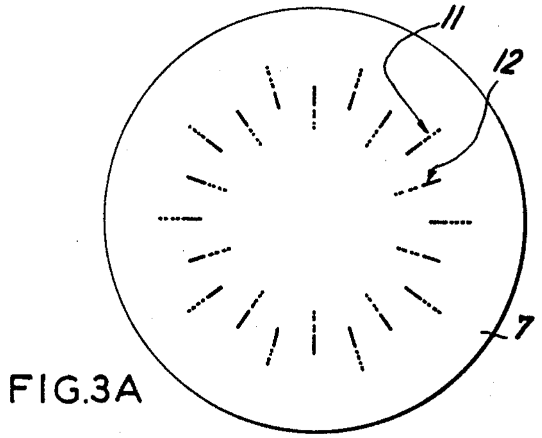
FIG. 3A is a front view of the disc (looking from the downstream side) and shows the arrangement of the ports.

FIG. 3A shows the disc looking on the downstream side. In this figure, the openings of the ports on the upstream side have been shown in broken lines, said openings being spaced at intervals in two concentric rings and designed to move respectively in front of the outlets of the two upstream nozzles when the distributor disc 7 moves in rotation. The openings of the ports on the downstream side are shown in full lines; said openings are spaced at an angular distance $\alpha$ in a same intermediate ring between the two rings previously mentioned and thus move, at the time of rotation of the disc, in front of the inlet of the downstream nozzle.

Figure 4:
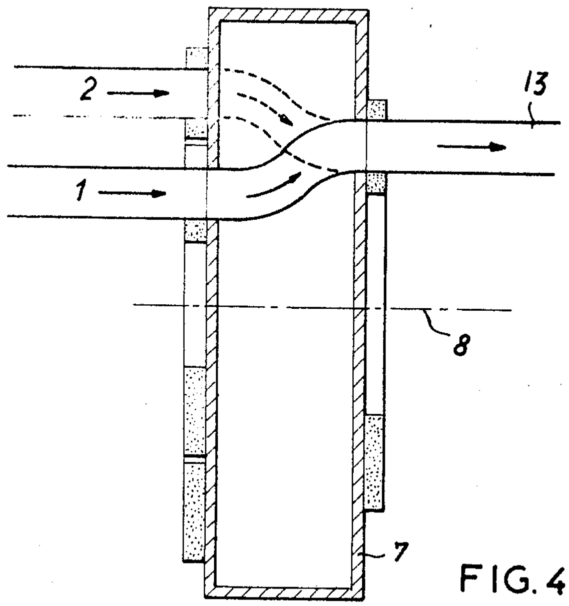
FIG. 4 illustrates one form of embodiment wherein the sonic throats are only two in number, are stationary and placed at the ends of the upstream nozzle.
Figure 4A:
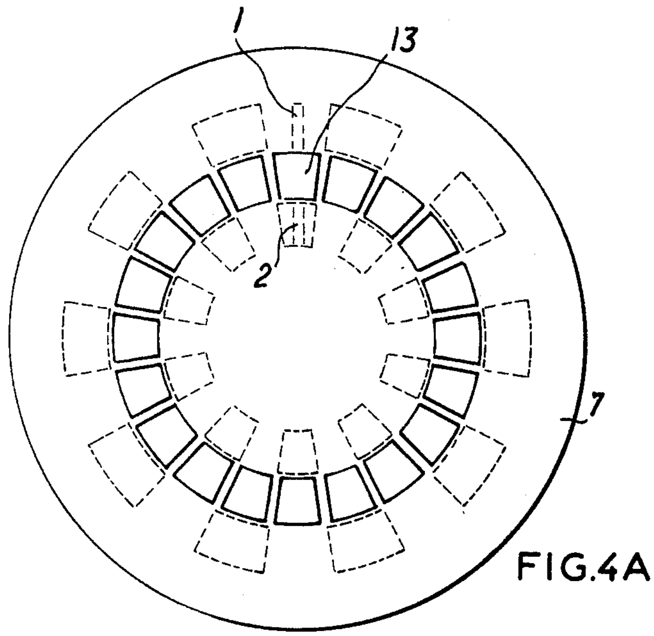
FIG. 4A represents in the same form of embodiment a front view of the disc and shows the arrangement of the ports.

In accordance with the form of embodiment which is illustrated in FIGS. 4 and 4A, the sonic throats are no longer formed at intervals in the disc but are stationary and only two in number, and are located at the extremities of the two upstream nozzles 1 and 2.

FIG. 4A represents a front view of the disc showing the arrangement of the ports (the annular seals which are applied against the disc having been omitted from the figure) and the sonic-throat ends of the upstream nozzles 1 and 2.

In the different forms of embodiment of the invention which have been described in the foregoing, the ratio of the width of the sonic throats or equivalent means to the width of the oppositely facing nozzle openings will preferably be chosen of sufficiently small value to obtain a sharply defined boundary between the two gas-zones of different characteristics. On the other hand, the ports must be arranged in the disc in such a manner as to ensure that the two upstream nozzles are not simultaneously in communication with the downstream nozzle and that there is always one upstream nozzle in communication with said downstream nozzle.

The problems of leak-tightness and lubrication at the points of contact of the disc with the upstream and downstream nozzles can be solved simultaneously as described above by employing nozzle spigot-rings of hard graphite consisting of stationary sleeves or annular members which are directly applied in rubbing contact with the rotating disc under constant and adjustable pressure (for example by means of springs). Since said spigot-rings form seals and are subject to wear as a result of friction, the thickness thereof decreases according to the length of service. Graphite can be replaced by any other suitable material, for example molybdenum bisulphide, which can be deposited in thin layers on the metallic components between which it is desired to ensure a leak-tight contact as well as effective lubrication.

The problem of injection of fuel can be solved in different ways.

If the fuel employed is a gas such as methane, propane, natural gas and the like, it is possible, for example, as in the form of embodiment of FIG. 1, to introduce said fuel-gas with the oxidant in each of the upstream nozzles and at suitable flow rates so as to obtain within said nozzles two gaseous mixtures having a fixed fuel concentration.

If a liquid fuel is employed such as kerosene, said fuel will in that case be injected on the downstream side of the disc by employing, for example, a double nozzle which converges into the downstream nozzle and by effecting a pulsed injection of fuel into each branch of the double nozzle in step with the gas-flow which is delivered from the corresponding upstream nozzle, the quantities injected being chosen in such a manner as to obtain predetermined fuel concentrations of the two gas streams.

It will also be possible, again in the case of utilization of a liquid fuel to place an injector for the continuous injection of fuel within the combustion chamber and an injector for the pulsed injection of fuel within one of the branches of the double nozzle in step with the flow of the corresponding upstream nozzle so as to produce an additional fuel enrichment of the gas which is delivered from said nozzle relatively to the other nozzle in which the fuel is supplied only by the continuous-flow injector which is located within the combustion chamber.

The main parameters of operation of the device are:

(a) The temperature $T_1$ of the hot zones, which is usually fixed near the maximum value which can be obtained according to the fuel employed (of the order of 3,200° K. in the case of kerosene), the temperature $T_2$ of the cold zone, the temperatures $T_{01}$, $T_{02}$ within the corresponding upstream nozzles, the corresponding concentrations $r_1$ and $r_2$ of fuel and the ratios of nitrogen content to oxygen content of the gases of the upstream nozzles, namely:

$$\left(\frac{N_2}{O_2}\right)_1 \text{ and } \left(\frac{N_2}{O_2}\right)_2$$

These parameters are fixed during operation as indicated above in such a manner as to eliminate any pressure disturbances in the interface regions between hot zones and cold zones.

If kerosene is employed having the summary formula: $C_{10.4}H_{20.8}$, the following parameters will be chosen by way of example:

$$T_1=3{,}000°\ K.,\ r_1=1.1,\ T_{01}=515°\ K.,\ \left(\frac{N_2}{O_2}\right)_1=0.66$$

$$T_2=2{,}000°\ K.,\ r_2=0.77,\ T_{02}=300°\ K.,\ \left(\frac{N_2}{O_2}\right)_2=3.76$$

(b) The mass flow within the nozzle, which depends on the initial pressures $P_{01}$ and $P_{02}$ within the upstream nozzles and on the dimensions of the sonic throats.

Said mass flow is established by the thermal power to be converted by the magnetohydrodynamic generator. The values $P_{01}$ and $P_{02}$ are adjusted with respect to each other so as to obtain identical flow velocities.

(c) The wavelength, which is equal to the distance between the fronts of two hot zones or two cold zones.

The wavelength is preferably chosen in such manner as to have at least two wavelengths within the air-gap of the electromagnet, the length of said air-gap being in turn determined by the desired efficiency of the magnetohydrodynamic generator.

The wavelength and velocity of gases within the conversion chamber determine the frequency of recurrence of hot zones and cold zones (usually between 100 and 1,000 c./s.) and consequently the angular velocity of the disc. Said angular velocity is limited by the action of centrifugal forces and friction forces produced by rubbing contact with the annular seals.

What I claim is:

1. Method of temperature modulation of a gaseous mixture for supply to a magnetohydrodynamic generator, the steps of preparing at least two fuel mixtures having different compositions then preheating the mixtures to different temperatures and then continuously and alternately admitting each of said mixtures within a combustion chamber supplying said magnetohydrodynamic generator.

2. Device for supplying a magnetohydrodynamic generator, comprising means for supplying two ducts with respectively two fuel mixtures having different compositions, a combustion chamber for receiving said mixture and for supplying the magnetohydrodynamic generator, a rotary member for putting each duct into communication with said combustion chamber in alternate sequence whereby said magnetohydrodynamic generator is supplied with a temperature-modulated gas and means located upstream of said rotary member for heating the two fuel mixtures to different temperatures.

3. Device in accordance with claim 2 wherein the two ducts open onto a first face of said rotary member, said member having a plurality of ports located at intervals in staggered relation in two concentric rings to move in front of the outlets of said two ducts respectively.

4. Device in accordance with claim 2, said ducts each having a terminal annular seal, said elastic means applying said seals against said member.

5. Device in accordance with claim 4, said terminal annular seal being formed of a lubricating material.

6. Device in accordance with claim 2, said ports have their openings on the second face of said member in a same ring and put said ducts into communication with a single duct for supplying said combustion chamber.

7. Method of improving the yield of magnetohydrodynamic generator by modulating the temperature of a gaseous mixture supplied to the generator, the steps of preparing at least two fuel mixtures of the same components having different fuel enrichments, then alternately admitting said mixtures at a predetermined frequency into a combustion chamber and then continuously feeding the combustion products into the magnetohydrodynamic generator.

8. A magnetohydrodynamic generator assembly comprising means for supplying a plurality of ducts with respective fuel mixtures of the same components having different fuel enrichments, a combustion chamber, a magnetohydrodynamic generator fed by said combustion chamber, a rotary member, openings in said rotary member so located as to sequentially connect each of said ducts with said chamber and means for rotating said member at a constant speed.

9. A magnetohydrodynamic generator assembly comprising means for supplying a plurality of ducts with respective fuel mixtures of the same components having different fuel enrichments, a combustion chamber connected to said ducts, a sonic throat in each of said ducts upstream of said combustion chamber, a magnetohydrodynamic generator fed by said combustion chamber, a rotary member, openings in said rotary member so located as to sequentially connect each of said ducts with said combustion chamber and means for rotating said rotary member at a constant speed.

References Cited

UNITED STATES PATENTS

| | | | |
|---|---|---|---|
| 2,409,036 | 10/1946 | Goddard | 219—99 |
| 2,523,012 | 9/1950 | Goddard | 158—4 |
| 2,635,813 | 4/1953 | Schlenz | 158—11 |

JAMES W. WESTHAVER, *Primary Examiner.*

E. G. FAVORS, *Assistant Examiner.*